I. KINNEY.
LATHE ATTACHMENT.

No. 182,762. Patented Oct. 3, 1876.

WITNESSES:
Thomas James Beech
Philip J. Edmund

INVENTOR:
Israel Kinney
by attorney
Henry Beech

UNITED STATES PATENT OFFICE.

ISRAEL KINNEY, OF LONDON, ONTARIO, CANADA.

IMPROVEMENT IN LATHE ATTACHMENTS.

Specification forming part of Letters Patent No. 182,762, dated October 3, 1876; application filed July 21, 1876.

*To all whom it may concern:*

Be it known that I, ISRAEL KINNEY, of the city of London, in the Province of Ontario, Canada, have invented certain new and useful Improvements in Lathe Attachments; and I hereby declare that the following is a full, clear, and exact description of the same, reference being had to the accompanying drawings, where—

Figure 1:
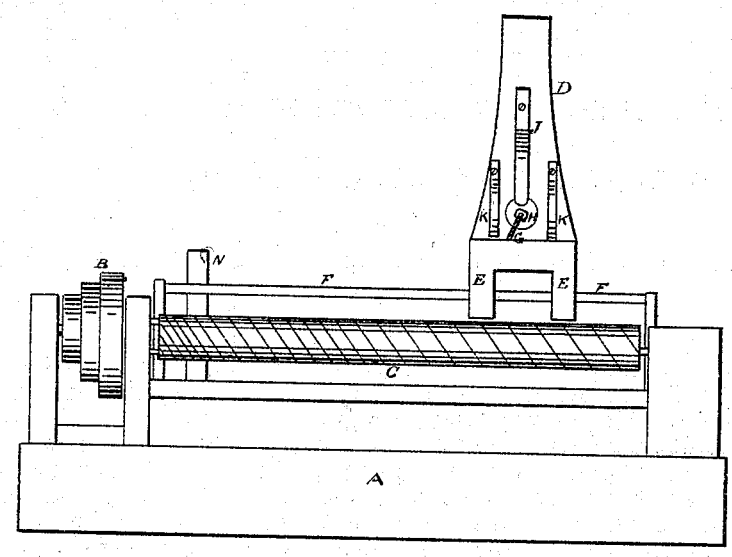
Figure 2:
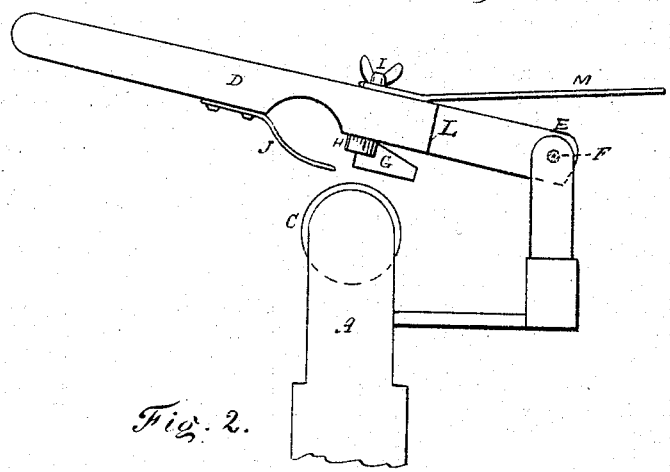

Figure 1 is a front view of my invention. Fig. 2 is a side view of the same.

The object of my invention is a device for cutting or marking spirals and other ornamental designs on articles of furniture and other objects, either in wood or metal, and, though intended to be used in a lathe, where it is almost self-acting, it may, if desired, be used as a hand-tool.

A is a portion of an ordinary lathe, and B the cone round which passes the ordinary driving-belt. C is a pillar, fixed in said lathe in the usual manner, to be operated upon. D is the tool-holder, shaped substantially as shown, and usually sliding by means of jaws E upon rail F, which is attached by any suitable means to the lathe. G is a marking or cutting tool, projecting from the tool-holder D, and connected thereto by revolving bolt H, which bolt passes through the holder, and is operated by a thumb-screw, I, on top. When the holder is pressed downward, the edge of the marking or cutting tool encounters the face of pillar C, or other object intended to be operated upon. If the said tool were set at right angles to the pillar C, it is obvious that a continuous ring would be made upon the surface of the latter; but the tool being set at an angle more or less acute to the pillar C, and a pressure being applied to it, the result of this angular set of the tool is that the revolution of the pillar or other object, while thus engaging the tool, will carry the holder along in a direction parallel to the pillar, thereby causing the formation of a continuous spiral upon or in the surface of said pillar.

Ornamental designs may be produced by using a roller or other suitable tool, attached to the holder, and operated as described. Spiral moldings and other designs may be cut into the surface of the objects to be operated upon by attaching a gouge or other suitable tool.

K K are springs fastened on each side of the tool, and raising the holder from the face of the pillar C, so that when at rest the tool will not be in contact therewith. L is a joint in the holder, which, in conjunction with the springs K, allows the tool to conform to any elevation or depression of the material operated upon. M is a lever on the upper side of the holder, attached to the revolving bolt H, and is used for setting the tool or for changing its angle while in motion.

What I claim is—

As a new mechanical device for cutting and marking spirals and other ornamental designs, the sliding holder D, in combination with the adjustable cutting or marking tool G, attached angularly thereto, substantially as shown and described.

ISRAEL KINNEY.

Witnesses:
HENRY BEECH,
THOMAS BEECH.